Patented Sept. 14, 1937

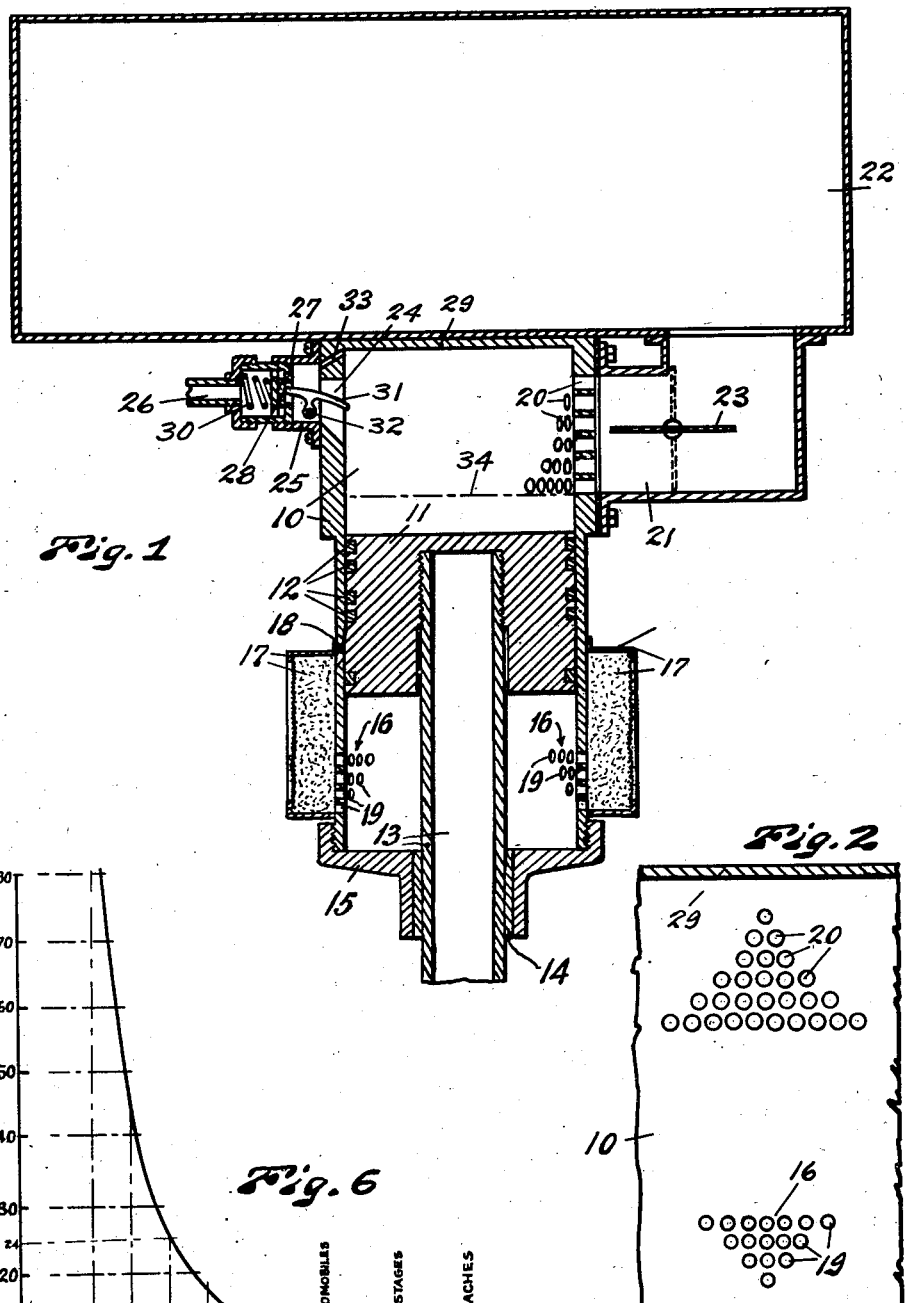

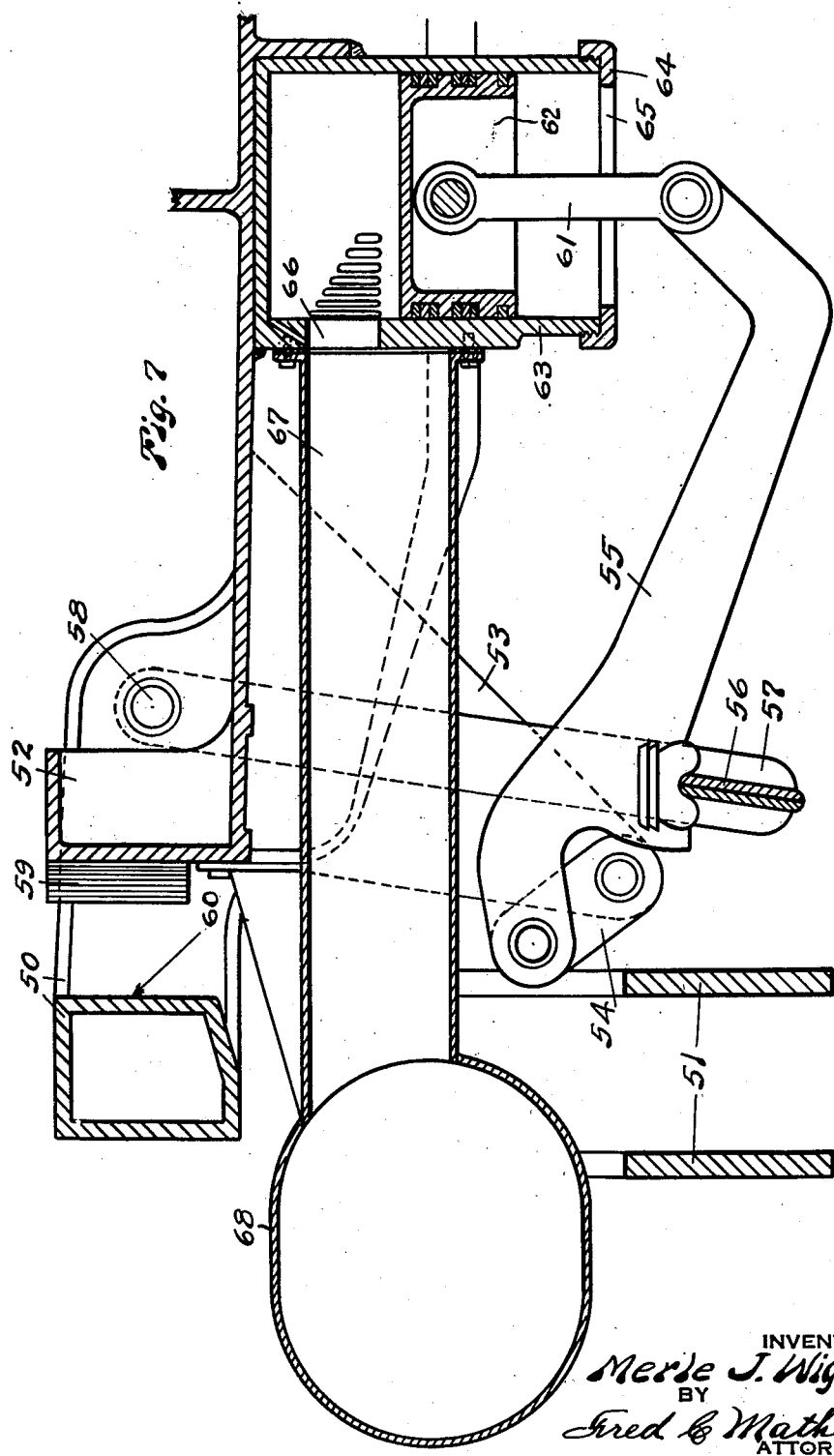

2,093,259

UNITED STATES PATENT OFFICE 2,093,259

MECHANICAL AIR CUSHIONING DEVICE

Merle J. Wightman, Seattle, Wash., assignor to Burns Lyman Smith, Seattle, Wash., as trustee Application January 18, 1935, Serial No. 2,444

14 Claims. (Cl. 267—64)

This invention relates to mechanical air cushioning devices of a type adapted to absorb and filter out vibrations between two relatively movable mechanical parts.

The general object of this invention is to provide a mechanical air cushioning device having a very low natural period of oscillation. Another object is to provide a mechanical air cushioning device which is especially well adapted for use in connection with passenger vehicles to absorb and suppress rapid vibrations and oscillations which are unpleasant and fatiguing to the passenger and, in this way, to provide for much greater riding comfort.

This invention contemplates the use of an air cushioning device employing a very large volume of air under pressure whereby rapid vibrations transmitted thereto will be slowed down and absorbed and converted into very slow oscillations of greatly reduced amplitude. These air cushions are adapted to be used either as the sole means of suspension of a load or in connection with, and supplemental to, the usual metallic springs.

I find that the elimination of unpleasant vibrations and oscillations in any resiliently suspended passenger carrying apparatus depends upon the attainment of a relatively low natural period or frequency of oscillation in the resilient suspension means. The so called natural period or frequency of oscillation herein referred to is that rate of oscillation per unit of time at which any particular combination of weight and compliance tends to oscillate after it has been started. The unit of time herein used is the second and the natural period of oscillation is therefore expressed as the number of oscillations per second. This natural period or frequency of oscillation is always the same for any given weight and compliance. The term compliance, as herein used, refers to the elastic qualities of the load supporting medium. The compliance for any given load may be defined as the ratio of displacement, due to such load, to the total volume of air subject to expansion or contraction, it being assumed that the air is not restricted and not subject to friction in its movement.

In resilient suspension mechanism the lower the natural period of oscillation of the suspension means the greater is the compliance and the greater the riding comfort. I find that the compliance varies inversely as the square of the natural period of oscillation. I also find that to secure reasonably good riding comfort and absence of fatigue for passengers riding in passenger vehicles it is necessary to reduce the natural period of oscillation of the passenger suspension means to at least as low a rate as one complete oscillation per second and that it is more desirable and affords greater riding comfort if this rate of oscillation is reduced still further, to a rate somewhere between one complete oscillation per second and one half of one complete oscillation per second.

I find the average natural periods of oscillation of present day passenger carrying road and rail vehicles to be substantially as follows: for automobiles approximately two oscillations per second; for auto-stages approximately two and one half oscillations per second and for railway passenger coaches approximately three oscillations per second. This is far above the maximum of one complete oscillation per second, which I find must be attained before fairly good riding comfort is secured.

It is an object of this invention to provide practical and efficient air cushion means readily applicable to present day vehicles for reducing the natural periods of oscillation of the vehicles or of the passenger supporting seats or berths of the same to one complete oscillation per second or less.

It is another object of this invention to provide air cushioning devices of this nature having an extremely low natural period of oscillation and, at the same time, having means efficiently controlling excessive displacement of the same.

Other and more specific objects of the invention will be apparent from the following description taken in connection with the accompanying drawings.

In the drawings Figure 1 is a vertical sectional view of a mechanical air cushioning device embodying my invention.

Fig. 2 is a fragmentary elevation with parts in section of a portion of the same showing port area means.

Fig. 6 is a diagram showing graphically the relation between natural period of oscillation and riding comfort or compliance.

Fig. 7 is a fragmentary sectional view with parts in elevation showing an adaption of the invention to a railway passenger coach.

Like reference numerals designate like parts throughout the several views.

Figure 3:
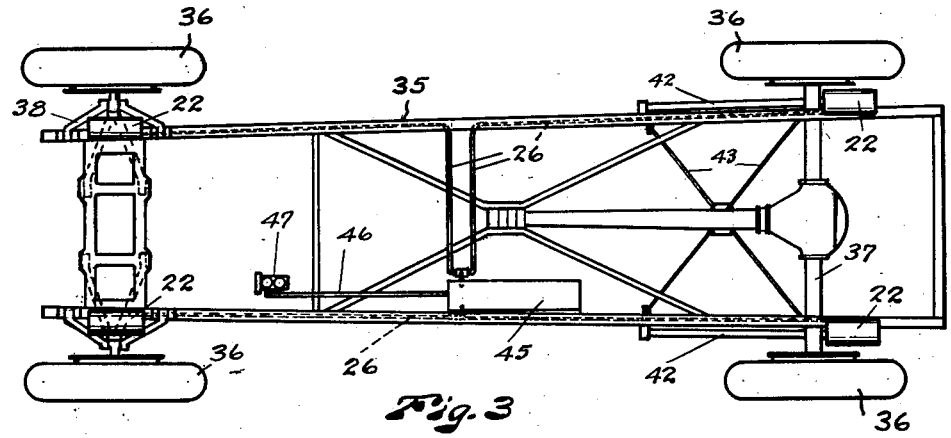
Figs. 3, 4 and 5 are somewhat diagrammatic views in plan, side elevation and front elevation respectively showing one adaption of the device to a motor vehicle.

Referring to Fig. 1, the numeral 10 designates a pneumatic cylinder having a piston 11 reciprocably disposed therein. The piston 11 may be provided with rings 12 and is connected with a piston rod 13. The piston rod 13 extends outwardly through a bearing member 14 in a head 15 and may be connected with any load or load supporting member as hereinafter set forth. The walls of the cylinder 10 are provided with lower port areas 16 positioned near the lower end of said cylinder and adapted to permit a free inlet and outlet of air during normal operation of the piston.

These port areas 16 are of generally triangular shape with the wider base of the triangle at the top and the narrower apex portion at the bottom. Said port areas 16 are preferably made by providing openings 19 in the cylinder walls within the triangular port area, the openings covering the major portion of the port area and the metal between the openings constituting supporting means for the piston 11 and piston rings 12 when the piston overlaps the port areas 16. The openings 19 may be in the form of drilled holes, as shown, or they may be in the form of slots. The lowermost openings 19 of the port areas are preferably spaced a short distance above the cylinder head 15 so that, in the event of excessive downward movement of the piston 11, said piston will first be uniformly retarded by the building up of air pressure as the openings 19 of the triangular port areas 16 are closed off and will then be positively cushioned and stopped, without damage to the head 15, by the pocket of air trapped between the head 15 and the lower end of said piston 11 in the event said piston moves downwardly far enough to entirely close off all of the openings 16.

A combined air filter and muffler 17 is preferably provided externally of the slots 16. An exhaust port 18 is provided just above the slots 16 so that it may be uncovered near the limit of the downward movement of the piston 11 to relieve pressure above the piston 11 in the event said piston is forced a substantial distance below its normal operating position.

The upper end portion of the cylinder 10 constitutes the cylinder space in which the air is maintained under pressure. A substantially triangular upper port area having openings 20 therein is provided in the cylinder wall near the upper end thereof. The openings 20 of this upper port area provide port means through which air may freely flow into and out of the cylinder 10 when the piston 11 is operating normally. This upper port area, including the openings 20, is of generally triangular shape with a tip of the triangle at the top and a base of said triangle at the bottom as shown in Fig. 2. The sides of the triangle are preferably curved concavely. The shape of the triangle is such as to provide for a uniformly increasing pressure against the piston as said piston moves toward the upper end or head 29 of the cylinder and successively closes the openings 20. The uppermost opening 20 is positioned a short distance below the end or head 29 of the cylinder leaving a cushion chamber in the upper end portion of the cylinder which positively stops the upward movement of the piston 11 short of the end 29 of the cylinder.

The openings 20 open into a relatively large conduit 21 which connects with a large compliance tank 22. A manually operated valve 23 is provided between the compliance tank 22 and the cylinder 10 for regulating the area of the opening therebetween.

An inlet port 24 for air under pressure is provided in the cylinder 10 near the upper end thereof. This inlet port 24 communicates with a valve housing 25, which is positioned externally of the cylinder 10, and connected with an air pressure supply pipe 26. The valve housing 25 has a valve seat 27 cooperating with a check valve 28 which is urged closed against said valve seat by a compression spring 30. The valve 28 normally prevents the inlet of air under pressure from the air supply pipe 26 to the cylinder 10. A valve operating lever 31 is mounted on a pivot 32 within the valve housing 25. One end of the valve operating lever 31 engages with the valve 28 and the other end of said valve operating lever 31 extends into the cylinder 10 and is positioned so as to be engaged by the piston 11 as it moves upwardly. If the piston 11 moves upwardly far enough to engage the lever 31 it will open the valve 28 and admit more air under pressure to the upper part of the cylinder. This will tend to restore the piston to its normal position. A separate passageway 33 of small area is provided between the valve housing 25 and the extreme upper end of the cylinder 10 to afford an initial inlet of air above the piston 11 in the event the piston should be at the extreme upper end of the cylinder.

The compliance tank 22 may be positioned at any desired location relative to the cylinder 10 as long as said compliance tank is connected with the cylinder by conduit means large enough to afford a free and unrestricted passageway for air therebetween. The volume of this compliance tank is many times the volume of the cylinder 10 and the natural period of oscillation of this comparatively large volume of air is very low. The volume of this compliance tank 22 is preferably not less than twenty times the average normal displacement of the piston 11 and, in practice, may be as much as eighty times the average normal displacement of the piston 11. The average normal displacement of the piston 11 is taken as the distance between the top face of the piston and the dot and dash line 34 shown in Fig. 1. This normal displacement represents the average movement of the piston in normal operation, as when a motor vehicle on which this device is installed is moving over a relatively smooth roadbed.

By making the compliance tank substantially twenty times the normal displacement of the piston I obtain a natural period of substantially one oscillation per second. A natural period of oscillation of (.5) or one half of one oscillation per second is obtained by making the compliance tank of a volume substantially eighty times the normal displacement of the piston.

In operation, the piston 11 will ordinarily assume a position substantially as shown in Fig. 1 and will have a normal range of movement approximately equal to the distance between the top end of the piston and the dot and dash line 34. This area between the top of the piston 11 and the dot and dash line 34 represents approximately the normal displacement of the piston. As hereinbefore pointed out, the volume of the compliance tank 22 is preferably from twenty to eighty times the normal displacement of the piston. The openings 20 afford enough area so that the flow of air is not retarded so long as all of said openings 20 are open. The piston 11 is thus normally working against a very large volume of air under pressure just great enough to sustain the load. This provides for great resiliency and leaves the piston free to move very easily. It also provides a condition in which the pressure of the air against which the piston is working will fluctuate very little during normal movements of the piston. This leaves the piston free to float up and down within the cylinder in absorbing minor vibrations without imparting any substantial component of these vibrations to the cylinder and parts connected therewith. The natural period of oscillation of a body of compressed air, having a volume of twenty times or more than twenty times the average volume of air displaced by the piston in normal operation, is reduced to as low a rate as one oscillation per second or less. This makes it impossible to set up an oscillation which is uncomfortable and fatiguing to passengers riding in vehicles provided with this air cushioning suspension.

If the piston is displaced upwardly more than a normal amount, as will frequently happen, it will begin to lap over and close the openings 20 of the upper port area. This will restrict the escape of air from the upper end of the cylinder and build up a uniformly increasing pressure opposing upward movement of the piston. By making the port area of a generally triangular shape, tapering toward the upper end portion, I secure a uniformly increasing resistance to movement of the piston which is very desirable. All ordinary upward displacements of the piston will be completely checked before the openings 20 are all shut off. In the event of a shock violent enough to move the piston upwardly beyond the upper limit of the openings there will be a pocket of air trapped in the upper end portion of the cylinder, which air will form a cushion preventing the piston from striking the upper end of the cylinder. The only outlet for the air thus pocketed will be through the very small initial air inlet opening 33. This outlet is of such restricted area that the piston will be brought substantially to a stop before it will encounter the end 29 of the cylinder. Also air escaping through passageway 33 can only escape into the valve housing 25 and must escape against a high pressure because by the time the piston 11 reaches a position high enough to entirely close off the port openings 20 the valve 28 will always be opened thus insuring a pressure in the valve housing 28 equal to the pressure in the inlet pipe 26.

If the piston 11 is caused to move downwardly below its normal operating position the air therebelow will escape freely through the openings 19 until the piston laps over and begins to cover said openings. Further downward movement of the piston 11 will then be retarded by a uniformly increasing air pressure due to the closing off of the openings 19 and the piston will finally be cushioned and stopped by the trapping of air in the cylinder below the lowermost openings 19. This prevents the piston from striking the lower cylinder head 15.

The piston 11 is normally self adjusting as respects its position in the cylinder. When the piston is at the upper end of the cylinder 10, as it may be in the total absence of air pressure, the valve 28 will always be open and air under pressure, as soon as available, can always enter between the piston and the cylinder head 29 to start the piston downwardly. As soon as piston 11 has moved downwardly far enough to release valve arm 31 the valve 28 will close but as soon as the piston is subjected to vibrations it will momentarily open the valve 28 at each upward movement and, by thus admitting compressed air intermittently, will build up enough pressure to maintain the piston in a normal operating position somewhere between the upper port openings 20 and the lower port openings 16. This position may be approximately the position shown in Fig. 1. If the piston moves too far downwardly in the cylinder, as it may do in response to a lessening of the load supported thereby, it will uncover the exhaust port 18 and allow some of the pressure to escape. The intermittent opening of this exhaust port 18, as the piston moves up and down in a position below its normal operating position will quickly restore the piston to the normal operating position. The piston 11 thus automatically regulates air pressure in the cylinder 10 and compliance tank 22, and in this way, automatically maintains substantially the same normal operating position irrespective of the load supported thereby. In other words this air cushioning device is self adjusting in response to different loads and quickly adjusts itself to the correct position regardless of the load supported on the automobile, auto bus, railway car or other vehicle or device on which this air cushion means is installed.

The valve 23 is adjustable from the exterior of the conduit 21 and may be set in any position between the fully open position shown by full lines and the fully closed position, shown by dotted lines in Fig. 1. When the valve 23 is fully open the passage of air is not restricted in the conduit 21 but when said valve is partially closed the flow of air through the conduit 21 may be slowed down and the freedom of operation of the piston somewhat retarded. The valve 23 may thus serve as a means for modifying the operation of the piston in the normal zone of operation of said piston where the piston, in its movement, does not cover any of the port openings 20.

The graph, shown in Fig. 6, shows visually and in a simplified manner the relationship of the somewhat complex factors involved in the practical construction of air cushioning devices of this type. This graph shows the relationship between riding comfort, as expressed in terms of compliance, and the natural period of oscillation of the means upon which a person is riding. It also shows visually the relationship which exists between these factors, namely, compliance or riding comfort, natural period of oscillation, and the friction or decrement due to friction expressed by the factor "R" in an equation hereinafter stated.

The graph, shown in Fig. 6 is plotted in accordance with an equation generally recognized as applicable in determining the natural period of oscillation of any oscillating combination. This equation is as follows:

$$F = \sqrt{\frac{1}{LC} - \frac{R^2}{4L^2}}$$

where "F" equals frequency in oscillations per second; "L" equals load or weight; "C" equals compliance and "R" represents a factor of air friction or mechanical friction, which is analogous to resistance in electrical applications of this same formula.

The factor of friction "R", as defined in this equation, is very important in the problem of riding comfort, especially in association with an oscillating combination of large compliance. I have found by experiment, and the formula clearly brings out, the required relationship between compliance and friction clearly shown in the graph, namely, that the impressed energy which manifests itself in oscillation must be dissipated in a rapidly increasing ratio to the amplitude of oscillation. The graph shows that this absorption of energy, measured by the friction factor "R", must be inversely as the square of the compliance. It is obvious that as the compliance tank is progressively disconnected from the cylinder the factor of compliance is reduced and the factor of friction must be proportionately increased through the obstructive passageways, in the above defined ratio, in order to dissipate the energy of oscillation most efficiently and smoothly.

The spans of the natural periods of oscillation of automobiles, auto stages, and railway passenger coaches are shown in Fig. 6. These natural periods of oscillation have been determined by actual tests. The average natural period of oscillation for automobiles is lower than for other vehicles listed and will average about two oscillations per second. As the compliance or riding comfort varies inversely as the square of the natural period of oscillation, it will be apparent from the graph, Fig. 6, that if the number of oscillations per second is reduced from two to one the compliance or riding comfort will be increased substantially four times. The compliance or riding comfort is arbitrarily expressed in percentage on the graph. The percentage of riding comfort corresponding to two oscillations per second is substantially 6% and the percentage of riding comfort obtained by reducing the number of oscillations to one per second is substantially 24%. It is thus seen that the percentage of riding comfort increases very rapidly as the number of oscillations per second is reduced.

By providing a high compliance ratio I offset the effect of gravity to a very large degree. For instance, a body supported on a compliance ratio of 100 to 1 would act, as to vertical movement, as if the force of gravity were reduced to 1%. That is to say, should the drop of the supporting member of the combination, enlarge by one percent the combined volume of the compliance tank and cylinder space connected therewith, the resiliently supported member would follow such drop just 1% of the amount which the same resiliently supported member would follow were it free to respond fully to the force of gravity. Under such compliance ratio it is apparent that the resiliently supported body will tend to travel in a substantially level plane, within any chosen range of amplitude, indifferent to oscillations and vibrations of the member by which it is supported.

Figure 4:
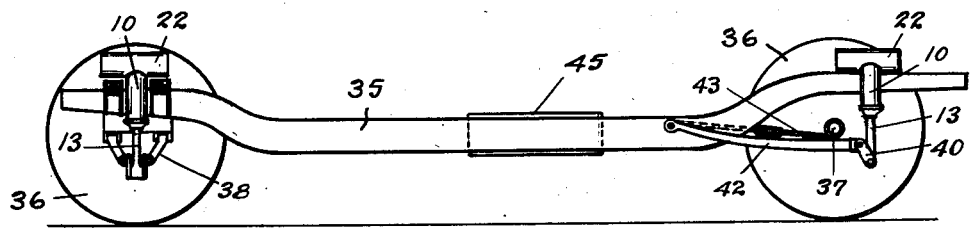
Figure 5:
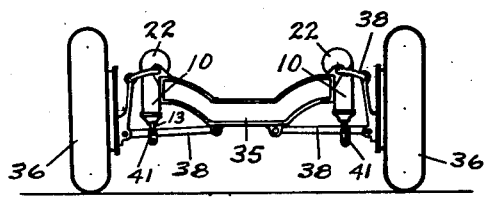

In Figs. 3, 4 and 5 I have shown this mechanical air cushion device installed on a motor vehicle, it being understood that these figures disclose only one illustrative installation, and that the manner of installation of the device may be widely varied to suit different requirements. The motor vehicle, a portion of which is shown in Figs. 3, 4 and 5, embodies a frame 35, wheels 36, a rear axle 37 and link means 38 connecting the front wheels and the frame. One of my air cushion devices is provided between the frame 35 and the supporting means for said frame near the location of each vehicle wheel. In each case the cylinder 10 is secured to the frame 35 of the vehicle. The piston rods 13 of the two rear cylinders are connected, as by link means 40, with the adjacent axle 37 of said motor vehicle. The piston rods 13 of the two front cylinders 10 are connected, as by short links 41, with the link means 38 by which the front wheels are connected with the frame. The air cushion means thus serves as the only resilient suspension means connecting the frame with the wheel supported parts of the vehicle. Non-resilient lever means 42 and truss means 43 may be used to floatingly connect the frame 35 with the rear axle in such a manner as to permit free relative vertical movement but to prevent the frame from moving longitudinally and transversely relative to the axle 37.

In Figs. 3 and 4, I show the several cylinders 10 connected by pipes 26 with a supply tank 45 for air under pressure. The supply tank 45 may be connected by a pipe 46 with an air pump 47 whereby the supply of air under pressure may be maintained.

In Fig. 7, I have illustrated my invention as applied to a railway passenger coach. In this installation the air cushioning device is working through lever means in such a manner that great compliance and a low natural period of oscillation are secured and at the same time a heavy weight is supported. The lever means also multiplies the movement of the piston, as respects the movement of the resiliently supported member. The resiliently supported member is also supported on inclined movingly mounted hanger means which cooperates with the air cushion means in such a manner as to tend to absorb and cushion transverse vibrations.

Referring to Fig. 7, the numeral 50 indicates a truck frame which is supported in any suitable manner from truck base means, a portion of which is indicated by 51. The truck base means 51 is supported in the usual manner from truck wheels not shown. 52 is a car frame which is resiliently supported from the truck frame 50 by my air cushion means. This car frame 52 has downwardly extending bracket means 53 which is connected by shackle link means 54 with the shorter end portion of a lever arm 55. The lever arm 55 is fulcrumed on a bearing member 56 of swinging hanger means 57. The swinging hanger means 57 is suspended from the truck frame by pivot means 58. The swinging hanger means 57 is inclined outwardly from top to bottom, as shown. Only one of these swinging hangers 57 is shown on one side of the car but it is understood that the air cushion and hanger mechanism will be in duplicate at the opposite side of the car so that the swinging hangers will be in balance and will tend to resist side sway of the car body. These swinging hangers, due to their inclined position, with their lower end portions farther from the center of the car than their upper ends, will always tend to suspend the car frame in a medial position. Elastic bumper means 59 may be provided on the car frame 52 in a position to engage with a stop member 60 on the truck frame to limit outward movement.

The longer end of the lever arm 55 is connected by a connecting rod 61 with a piston 62 in a pneumatic cylinder 63. The cylinder 63 is rigidly secured to the car frame 52. The lower end portion of the cylinder 63 has a head 64 provided with an opening 65 through which the connecting rod 61 extends. The end of the lever 55 may also operate through the opening 65 when the device is in use. The opening 65 also permits a free inlet and outlet of air below the piston. The upper end portion of the cylinder 63 is connected by a perforated port area 66 with a conduit member 67 which connects with a compliance tank 68. The conduit member 67 is relatively large and constitutes a part of the compliance compartment. The ratio of compliance area to normal piston displacement in this form of the invention is within the same limits as hereinbefore set forth.

The operation of this air cushion device is substantially the same as the operation of the previously described device except that the weight or load to be resiliently supported acts through the lever arm 55, making possible the resilient suspension of a greater weight with a cylinder and piston of a given size. The natural period of oscillation of the suspension means is reduced in this device in substantially the same manner as in the air cushion means disclosed in Figs. 1 to 5.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a mechanical air cushion device, a cylinder; a piston reciprocable in said cylinder; an air tight pneumatic compliance compartment of substantially larger volume than the cylinder communicatively connected with the upper portion of the cylinder by passageway means of relatively large area; and means for progressively reducing the said area of said passageway means to zero in a rapidly increasing inverse ratio to the displacement of the piston.

2. In a mechanical air cushion device, a cylinder; a piston reciprocable in said cylinder; an air tight pneumatic compliance compartment of substantially larger volume than said cylinder; and connecting means of relatively large area communicatively connecting said compliance compartment and the upper portion of said cylinder and affording an unrestricted passageway for the flow of air between said cylinder and said compliance compartment, the natural period of oscillation of the body of air in said compliance compartment and said cylinder being not more than one oscillation per second.

3. In a mechanical air cushion device, a cylinder; a piston in said cylinder; an air tight pneumatic compliance compartment of substantially larger volume than said cylinder; connecting means of large area communicatively connecting said compliance compartment and the upper portion of said cylinder and affording an unrestricted passageway of low impedance to the alternating movements of air between said cylinder and said compliance compartment; port means between said cylinder and said connecting means cooperating with said piston increasing said air impedance in substantially inverse ratio to the piston displacement as the piston moves upwardly over the port means; and a valve in said connecting means movable to regulate the area of the connecting passageway between said compliance compartment and said cylinder.

4. In a mechanical air cushion device, a cylinder; a piston in said cylinder freely movable in an area of normal displacement; an air tight pneumatic compliance compartment of substantially larger volume than said cylinder; connecting means of large area communicatively connecting said compliance compartment and the upper portion of said cylinder and affording an unrestricted passageway for the flow of air between said cylinder and said compliance compartment; and a perforated port area of substantially triangular shape provided in the cylinder wall between the cylinder and the connecting means positioned at a distance from the normal position of the piston to provide an area of normal displacement and comparatively great resiliency for the piston and adapted to be overlapped by the piston when said piston moves beyond the area of normal displacement, said port area being wider at the bottom and narrower at the top whereby an increase in the air pressure against the piston in substantially inverse ratio to the square of the piston displacement is provided as said piston moves over said port area.

5. In a mechanical air cushion device, a cylinder; a piston in said cylinder; an air tight pneumatic compliance compartment of substantially larger volume than said cylinder; connecting means of large area communicatively connecting said compliance compartment and the upper portion of said cylinder and affording an unrestricted passageway for the flow of air between said cylinder and said compliance compartment; a valve in said connecting means movable to regulate the area of the connecting passageway between said compliance compartment and said cylinder; and a perforated port area of substantially triangular shape provided in the upper portion of the cylinder wall between the cylinder and the connecting means, said port area being wider at the bottom and narrower at the top and providing a uniformly increasing air pressure in the upper portion of the cylinder as the piston moves upwardly over said port area.

6. In a mechanical air cushion device, a cylinder; a piston movable in said cylinder; an air tight pneumatic compliance compartment of substantially larger volume than said cylinder; connecting means of relatively large area communicatively connecting said compliance compartment and the upper portion of said cylinder; perforated port area means of substantially triangular shape provided in the upper portion of the cylinder wall between the cylinder and the connecting means, said port area means being wider at the bottom and narrower at the top and providing a uniformly increasing air pressure in the upper portion of the cylinder as the piston moves upwardly over said port area; and lower port area means of substantially triangular shape provided in the wall of the cylinder below the normal operating zone of the piston, said lower port area means being wider at the top and tapering to a narrower portion of reduced area at the bottom.

7. In a mechanical air cushion device, a cylinder; a piston movable within said cylinder; an air tight pneumatic compliance compartment of substantially larger volume than said cylinder; connecting means of large area communicatively connecting said compliance compartment and the upper portion of said cylinder, the combined volume of said compliance compartment and said connecting means and said cylinder providing a relatively low natural period of oscillation not in excess of one oscillation per second; and means dissipating the energy of oscillation in direct proportion to the change in the natural period of oscillation.

8. In a mechanical air cushion device, a cylinder; a piston reciprocable in said cylinder; an air tight pneumatic compliance compartment of substantially larger volume than the cylinder communicatively connected with the upper portion of the cylinder by passageway means of relatively large area; means progressively reducing the area of said passageway to zero in a rapidly increasing inverse ratio to the displacement of the piston; a fulcrumed lever arm connected with said piston; and a load resiliently supported from said lever arm.

9. In a mechanical air cushion device, a cylinder, a piston reciprocable in said cylinder; an air tight pneumatic compliance compartment of substantially larger volume than the cylinder communicatively connected with the upper portion of the cylinder by passageway means of relatively large area; a lever arm having one end portion connected with said piston; a swinging hanger affording a fulcrum for said lever; a vibratory truck frame from which said swinging hanger is suspended; and a car frame resiliently supported from the other end portion of said lever.

10. In a mechanical air cushion device, a cylinder; an air tight pneumatic compliance compartment of substantially larger volume than said cylinder; connecting means of relatively large area communicatively connecting said compliance compartment and the upper portion of said cylinder; perforated port area means of substantially triangular shape provided in the upper portion of the cylinder wall between the cylinder and the connecting means; a piston movable in said cylinder having a normal operating zone below said triangular port area means, said triangular port area means being wider at the bottom and narrower at the top and providing a uniformly increasing air pressure against said piston as said piston moves upwardly over said port area means; and manually controlled means positioned between said cylinder and said compliance tank operable to vary the air impedance to said piston in said normal operating zone.

11. In a device of the class described, in combination with instrumentalities for connecting the device to a motor vehicle and for cushioning the same against abnormal vibration, comprised of a cylinder, a piston reciprocably disposed within the cylinder, a piston rod, a plurality of ports extending through the side walls of the cylinder and spaced apart from the normal position of the piston within the cylinder, said ports being so spaced as to progressively retard the abnormal movement of the piston in either direction within the cylinder, a compliance tank, and means for communicating one end of the cylinder with the compliance tank.

12. In a device of the class described, the combination of a cylinder having cylinder heads closing its opposite ends, a piston and a piston rod assembly associated with the cylinder with the piston having freedom of oscillation in the mid-section of the cylinder and means for progressively decreasing the freedom of the oscillation of the piston as the piston approaches either head of the cylinder and means for automatically admitting air of relatively high pressure into the cylinder as the same approaches one of the cylinder heads.

13. In a device of the class described, the combination of a cylinder and a compliance tank with means communicating the cylinder with the compliance tank, a piston reciprocably disposed within the cylinder, and automatic means for progressively building up resistance to the movement of the piston as the same approaches the ends of the cylinder.

14. In a device for resiliently connecting two portions of a vehicle relative to each other, the combination of a cylinder the opposite ends of which have cylinder heads, means for supporting the cylinder relative to one portion of the vehicle, a piston and a piston rod associated within the cylinder, means for connecting the piston rod to the other portion of the vehicle, and instrumentalities for pneumatically setting up progressive resistance to the movement of the piston toward the cylinder heads, a compliance tank, means for communicating one end of the cylinder with the compliance tank and means for automatically admitting a compressed elastic fluid into one end of the cylinder when the piston approaches the end of its travel toward the cylinder head of the cylinder in which the piston oscillates.

MERLE J. WIGHTMAN.